June 19, 1928.  1,674,461
G. H. ABELL ET AL
ACTUATING MEANS FOR DIPPING OR TILTING HEADLIGHTS
Filed Sept. 28, 1926   2 Sheets-Sheet 1
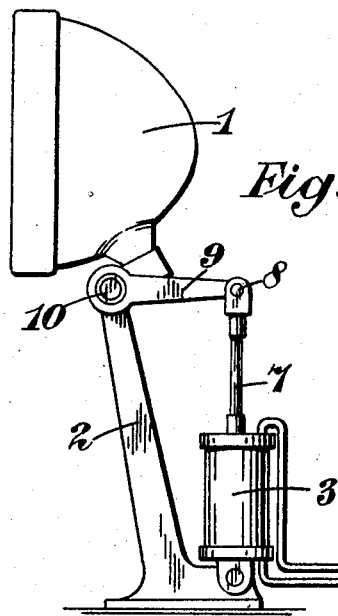
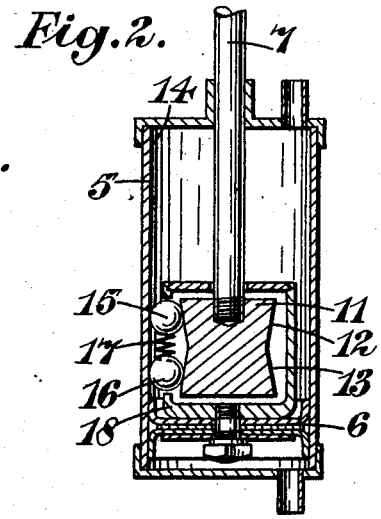
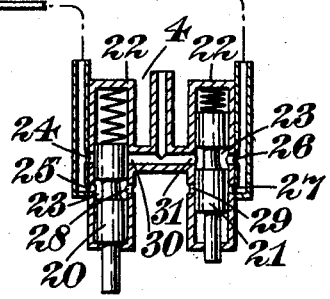
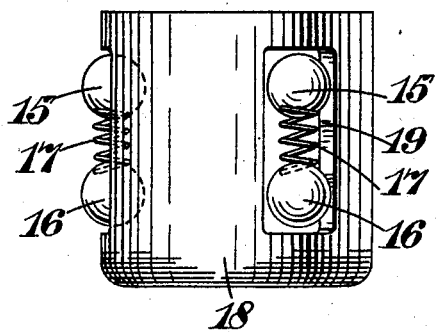
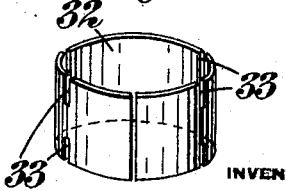

June 19, 1928.

G. H. ABELL ET AL 1,674,461

ACTUATING MEANS FOR DIPPING OR TILTING HEADLIGHTS

Filed Sept. 28, 1926   2 Sheets-Sheet 2

INVENTOR

Patented June 19, 1928.

1,674,461

UNITED STATES PATENT OFFICE.

GEORGE HENRY ABELL, OF ESHER, AND ROBERT GLADSTONE WELLS, OF MARPLE, ENGLAND, ASSIGNORS TO THE SHEFFIELD SIMPLEX COMPANY, OF KINGSTON-ON-THAMES, SURREY, ENGLAND, A BRITISH COMPANY.

ACTUATING MEANS FOR DIPPING OR TILTING HEADLIGHTS.

Application filed September 28, 1926, Serial No. 138,204, and in Great Britain October 3, 1925.

This invention relates to devices for tilting headlamps of the type arranged to tilt relatively to their mounting (for example, for the purpose of dipping lights). Generally the axis of tilting movement is substantially horizontal, but in some cases it is inclined to the horizontal so that the lamp is swung both upwardly or downwardly as the case may be, and also to one side. In some instances the lamp bodily upon its mounting has been movable; in others a part only of the lamp, for example, the reflector, has been movable, and in others still, a bracket carrying the lamp has been arranged to move so as to tilt the lamp. It is to be understood that the present invention relates to any and all of these various forms of headlamps and the term employed hereinafter "headlamp of the tilting type" is to be interpreted accordingly.

Hitherto the tilting movement of the headlamp has been effected by manual or pedal operation by the driver of the vehicle. The present invention has for its main object to provide an improvement upon this arrangement, whereby the operator shall not be required to supply the energy for tilting the lamps.

According to the invention, means for tilting a vehicle headlamp of the tilting type, comprise, in combination, a prime mover, operative connections between the prime mover and the headlamp, and control means for the prime mover. The control means would of course extend from the prime mover to the driver's seat so that the driver of the vehicle would be able to operate the lamps without moving from his normal driving position. The control means could, however, extend to any other convenient point in the vehicle, as desired.

As will be gathered from the preceding paragraphs, the present invention provides, briefly expressed, power-operated tilting means for tilting a headlamp of the type referred to, and the expression "prime mover" is to be understood as meaning any form of engine or motor operated by power, as distinct from manually or pedal operated means.

Conveniently, and according to one feature of the invention, the prime mover may comprise a piston and cylinder or their equivalent the movable element of which is moved in both directions by means of fluid pressure.

According to a further feature of the invention, there may be combined with the prime mover, means operatively associated with, or arranged for operative association with, the engine of the vehicle with which the headlamp and tilting device is to be employed, whereby fluid pressure (positive or negative) obtaining in the engine interior (e. g. in the induction system, in the case of the engine being an internal-combustion engine, or in the lubricating system of the engine) can be transmitted to and rendered operative upon the piston and cylinder tilting device.

The term "engine" is to be understood as meaning the engine proper or any associated part of it, as will be understood from the reference in the preceding paragraph to the induction and lubricating systems of the engine.

According to a further feature of the invention, the prime mover may comprise two linearly movable (e. g. reciprocable) members operatively connected to move in unison and arranged one to transmit movement to the other (said members being hereinafter referred to, respectively, as the operating and operated members), means providing a lost-motion connection between the two members, means operable (e. g. by wedge-action) automatically to arrest movement of the operated member when said movement is occasioned by thrust in the member other than that imparted to it in the normal operation of the mechanism by the operating member, and means actuated by the operating member during the lost-motion of the latter whereby, at the commencement of normal operation of the mechanism, the operated member is released from arrest by the automatic arresting means aforesaid.

The two linearly movable members referred to above may comprise the piston and piston-rod, respectively, of a fluid-pressure-operated piston and cylinder device, the latter constituting the prime mover of the invention. In this event, the operating-member of the two said members would be constituted by the piston and the operated member by the piston-rod.

The invention will now be further described with reference to the accompanying drawings which illustrate various embodiments by way of example.

In these drawings:

Figure 1 is a more or less diagrammatic representation of a vehicle headlamp with its pivotal mounting and with the power-operated tilting means of the invention.

Figure 2 is a vertical central section through a piston and cylinder embodiment of the power-operated tilting means of the invention.

Figure 3 is an external view of part of the mechanism shown in Figure 2.

Figure 4 is an external view of another part according to a certain modification of the invention.

Like reference characters indicate like parts in the various figures of the drawings.

Figure 5:
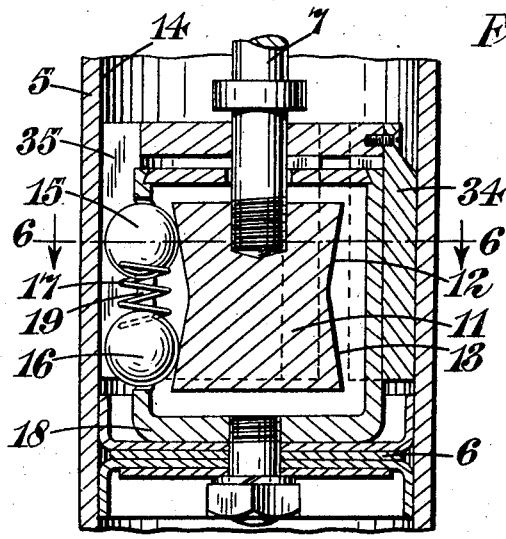
Figure 5 is a part vertical central section through a piston and cylinder embodiment of the power-operated tilting means of the invention, according to a further modification.

Referring first to Figure 1, the numeral 1 indicates the headlamp generally, 2 the pivotal mounting therefor, 3 the piston and cylinder operating device of the invention, and 4 valve means for controlling the operation of the piston and cylinder tilting device 3.

Referring next to Figure 2, this figure is a vertical section through the piston and cylinder device 3 of Figure 1. The device comprises a cylinder 5 closed at both ends, and a piston 6 slidable with a pressure seal from end to end of the cylinder 5. The piston 6 is operatively connected with a piston-rod 7 pivotally connected at its upper end 8 to a crank 9 fixed to a pivot 10 mounted in the upper end of the mounting 2 and constituting the pivot of the lamp 1, whereby the latter can swing about a substantially horizontal axis.

As will be appreciated, the lamp can be made to swing about the axis of the pivot 10 by introducing fluid under pressure into the cylinder to one side of the piston 6. If the pressure be supplied to the underside of the piston the lamp will be tilted downwardly and if pressure be supplied to the space above the piston, the lamp will be tilted upwardly.

The piston 6 is not directly connected to the piston-rod 7, but the connection is such between the two elements that a small degree of lost-motion is provided as between the piston and the piston-rod, in the direction of the length of the rod, so that as fluid under pressure is admitted to one side of the piston the piston is moved a short distance in the direction of the length of the piston-rod without any corresponding movement of the rod, and it is only after the lost-motion has been absorbed that the rod is moved in unison with the piston.

The purpose of this lost motion of the piston is to provide a means of releasing an automatic wedge-acting piston lock arranged automatically to lock the piston at any point of its reciprocatory travel to which it has been moved under the influence of the fluid pressure supplied to it.

The wedge-acting piston-lock comprises the following elements—a double conical wedge 11 fixedly carried upon the lower extremity of the piston-rod 7 and of such dimensions as to leave an annular space around it between the opposed conical wedging surfaces 12 and 13 and the inner wall 14 of the cylinder 5, two rows of circumferentially spaced wedge balls 15, 16 disposed so that the balls in the upper row are vertically above those in the lower and spring-pressed away from one another and into light contact with the wedging surfaces 12 and 13 of the wedge 11 and the inner surface 14 of the cylinder 5 by compression springs 17 interposed between each ball in the upper row, and the ball immediately below it in the lower row, and a cage 18 surrounding the wedge 11, fixed to the upper face of the piston 6 and functioning to transmit thrust from the piston 6 upwardly to the lower row of balls when the piston is forced upwardly, and downwardly to the upper row of balls when the piston is moved in the reverse direction.

The arrangement is such that the thrust imparted to the balls forces the latter out of wedging engagement with the edge 11 and the cylinder wall so that the piston-rod 7 is rendered free to slide relatively to the cylinder, and the arrangement is also such that when this has taken place the piston 6 moves into positive engagement with the rod 7 so that continued application of fluid pressure to the piston 6 results in the latter moving with the rod 7 to any position within the cylinder desired by the operator.

Accordingly the cage 18 is formed with elongated apertures 19 in the side of the cage in which apertures are accommodated the balls 15 and 16 with their compression springs 17 and the internal dimension of the cage in the direction of the length of the piston-rod is greater than the length of the wedge 11 in the same direction. As will be understood, when the piston 6 is relieved from fluid pressure the parts will take up positions such that the wedge 11 will lie centrally between the top of the cage and the bottom, so that a small space will be left between the cage and the wedge both at the top and the bottom of the latter. It will also be understood that both rows of balls 15 and 16 will be spring pressed into wedging engagement with the wedge 11 and the cylinder wall, so that movement of the rod 7 in the direction of its length will be automatically prevented in either direction. As before stated, however, the piston 6 is arranged to thrust either the one row or the other of the balls out of wedging engagement with the wedge 11 immediately fluid pressure is admitted to one side or the other of the piston. For this purpose, the dimensions of the apertures 19 in the direction of the length of the piston-rod are such that a shorter space, if any, is provided between the balls in the two rows and the respective ends of the aperture than is provided between the upper and lower end faces of the wedge 11 and the upper and lower inner end faces of the cage. In consequence of this proportioning of parts, as will be at once appreciated, the piston 6 during its lost-motion relatively to the piston-rod will exert thrust transmitted through the cage to the balls 15 or 16 so that the latter are forced, as aforesaid, out of wedging engagement with the wedge and the cylinder wall.

Any convenient means for controlling the flow of fluid under pressure into the cylinder may be provided. The means illustrated comprise a pair of plunger valves 20 and 21 slidable in a valve casing 22 and spring-pressed in one direction. The valves 20 and 21 are each formed with an annular recess 23 which is arranged to register alternately with ports 24, 25, 26, 27, 28, 29, 30 and 31 in the valve casing 22. Thus, when the recess of valve 20 is registering with ports 25, 28 the ports 24 and 30 are covered by the upper portion of the valve. Correspondingly, when the recess of valve 20 is in register with the ports 24 and 30, the ports 25 and 28 are covered by the lower portion of the valve. The same remarks apply to valve 21 and its associated ports.

The ports 24 and 25 are provided with conduit connections to the lower end of the cylinder 5 and the ports 26 and 27 are similarly provided with conduit connection with the upper end of the cylinder 5. The ports 30 and 31 have conduit connection with a source of fluid under pressure, which source may be a point in the induction system of the internal combustion engine of a motor vehicle with which the headlamp to be controlled is employed. Alternatively, the source of fluid under pressure may be the lubricating system of the vehicle with which the lamp is to be employed. Or again, the ports 30 and 31 may be placed into communication with the engine cylinder or with a part in communication therewith. The ports 28 and 29 communicate with the atmosphere.

The operation of the valves will be evident without description. It may be stated, however, that when one valve is operating to admit fluid to, say, the upper end of the cylinder so as to force the piston downwardly, the other valve is operating to provide an exhaust passage from the cylinder to the atmosphere.

Referring next to Figure 4, the part shown is a thin split sleeve 32 arranged to be interposed between the balls 15 and 16 and the inner wall of the cylinder, and to move in unison with the cage 18. In order that the sleeve shall move in unison with the cage it may conveniently be accommodated between upper and lower circumferential lips provided around the upper part and lower part respectively of the cage. These lips are not shown in the drawing. The object of this sleeve is to provide means whereby the internal wall of the cylinder may be preserved from damage by the wedging action of the balls. A further advantage of the sleeve is that wedging pressure is more distributed about the cylinder wall, with the result that the locking action is more efficient. Preferably the sleeve is partially slitted, as shown at 33, at various points around the circumference, and the balls are disposed opposite the slits.

Figure 6:
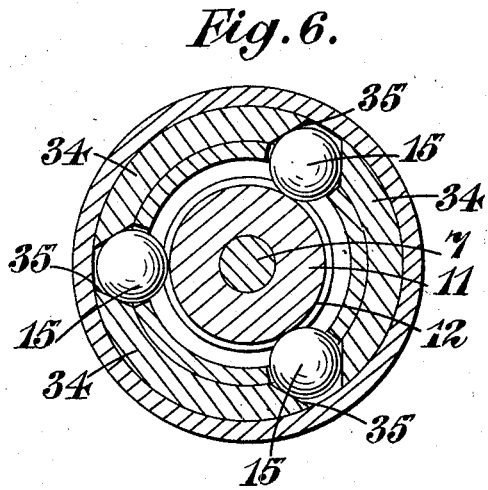
Figure 6 is a horizontal section corresponding to Figure 5 and taken along the section line 6—6 of that figure.

Referring next to Figures 5 and 6, the modification represented by these figures is the provision of cam-acting segments 34 of arcuate cross-section, disposed around the inner wall of the cylinder 5 between the balls of the two rows 15 and 16. The segments 34 occupy the space between the cylinder wall and the sides of the cage 18 and they are formed, where they abut against the balls 15 and 16, with cam faces 35, the arrangement being such that as the balls 15 and 16 are forced outwardly by the action of the wedge, as for any reason the piston-rod 7 is moved either upwardly or downwardly, otherwise than by the thrust of the piston, the balls function to force the segments 34 radially outward into frictional engagement with the cylinder wall. For this purpose the balls 15 and 16 are spring-pressed into light wedging-contact, not with the cylinder wall itself, but with the cam faces 35 of the segments 34. The segments are arranged to slide in the cylinder with the cage and the piston. Otherwise the construction corresponds to that described with reference to Figure 2.

Various modifications may be made without departing from the spirit or scope of this invention. For example, instead of the wedge 11 shown in Figures 2 and 5 being of the form illustrated, it may take the form of a double conical wedge with the portion of largest diameter disposed at the mid-length of the wedge instead of at opposite ends thereof. There is an advantage, however, in the construction described and illustrated in this connection in that it lends itself to simplicity of construction.

A further instance of a possible modification within the scope of the invention would be the provision of rollers instead of balls as the wedge-dogs of the wedging means.

We claim:

1. A headlight controlling device comprising in combination a casing, an element movable therein and arranged to control direction of the light beam, connections communicating with the casing on both sides of the element and with the interior of the vehicle engine, controlling means so arranged that the pressure obtaining within the interior of the engine can be transmitted at will to one side or the other of the movable element to move the latter in a chosen direction, and automatic locking means arranged within the casing for locking the element in any position to which it has been moved.

2. A headlight controlling device comprising in combination a casing, an element movable therein and arranged to control the direction of the light beam, connections communicating with the casing on both sides of the element and with the interior of the vehicle engine, locking means arranged within the interior of the casing and operating normally to lock the movable element in position therein, controlling means so arranged that the pressure obtaining within the interior of the engine can be transmitted to one side or the other of the movable element to release the locking means and move the element in a chosen direction, and a lock-releasing device operating to free the lock upon application of pressure thereto before movement of the said element.

3. A headlight controlling device comprising a casing, a pressure-operated element movable therein for controlling the direction of the light beam, locking means between the said element and its casing to hold the element normally fixed, and an element adapted automatically to advance and release the locking means when pressure is admitted to move the said pressure-operated element.

4. A headlight controlling device comprising a casing, a pressure-operated element movable therein for controlling the direction of the light beam, locking means between the said element and its casing to hold the element normally fixed and a lock-releasing element freely mounted in the casing to move independently of the pressure-operated element and adapted to advance and release the locking means when pressure is admitted to move the said pressure-operated element.

5. A headlight controlling device comprising a casing, a pressure-operated element movable therein for controlling the direction of the light beam, locking means between the said element and its casing to hold the element normally fixed and a lock-releasing element adapted to advance and release the locking means when pressure is admitted to move the pressure-operated element and subsequently to cause movement of the latter by contact therewith under pressure after the locking means has been released.

6. A headlight controlling device comprising a piston-and-cylinder device, a member for controlling the light-beam controlled by said device, locking means for the controlling member, a lost-motion connection between the latter and the piston, and lock-releasing means carried by the latter and operating during movement under pressure to take up the lost-motion to free the locking device and then to cause movement of the controlling member.

7. A headlight controlling device comprising a piston rod for controlling the light beam, a piston mounted with freedom of movement with respect to said rod, a locking device so arranged as to co-operate with the piston-rod as normally to lock it against movement and a lock-releasing device carried by the piston and operating to release the lock before the piston operates to move the piston rod.

8. A headlight controlling device comprising a piston rod for controlling the light beam, a piston mounted with freedom of movement with respect to said rod, a locking device so arranged as to co-operate with the piston rod normally to lock it against movement and a lock-releasing device carried by the piston and operating to release the lock before the piston operates to move the piston rod and also operating to resume its locking-position when the pressure upon the piston is removed.

9. A headlight controlling device comprising a piston rod for controlling the light-beam, a piston, lost-motion between the two, a wedge-shaped element carried by the piston rod, locking elements normally urged into contact with the said element to maintain the piston-rod stationary, and lock-releasing means carried by the piston which, during the initial movement of the latter, free the locking elements from locking engagement with the piston rod and allow the latter to move upon further movement of the piston.

10. A headlight controlling device comprising a piston rod for controlling the light-beam, a double-acting piston and cylinder device, the piston being arranged to have a limited freedom of movement independently of the piston rod and axially of the latter, a locking wedge in the form of two truncated cones disposed on the piston rod with the ends of larger diameter facing in opposite directions, two series of co-operating locking balls urged between the conical surfaces of the wedge and the cylinder wall and serving to lock the piston rod normally in a rigid position, and lock-releasing means carried by the piston and adapted to release the balls from the wedge on initial movement of the piston in either direction.

11. A headlight controlling device comprising a piston rod for controlling the light-beam, a double-acting piston and cylinder device, the piston being arranged to have a limited freedom of movement independently of the piston rod and axially of the latter, a locking wedge in the form of two truncated cones disposed on the piston rod with the ends of larger diameter facing in opposite directions, two series of co-operating locking balls urged between the conical surfaces of the wedge and the cylinder wall and serving to lock the piston rod normally in a rigid position, and a cage within which the balls are positioned carried by the piston and surrounding the locking wedge so that upon initial movement of the piston the balls are carried by the cage out of locking engagement with the wedge.

12. A headlight controlling device comprising a piston rod for controlling the light-beam, a double-acting piston and cylinder device, the piston being arranged to have a limited freedom of movement independently of the piston rod and axially of the latter, a locking wedge in the form of two truncated cones disposed on the piston rod with the ends of larger diameter facing in opposite directions, two series of co-operating locking balls urged between the conical surfaces of the wedge and the cylinder wall and serving to lock the piston rod normally in a rigid position, a resilient wearing sleeve movable with the piston and piston rod interposed between the balls and the cylinder wall and lock-releasing means carried by the piston and adapted to release the balls from the wedge on initial movement of the piston in either direction.

13. A headlight controlling device comprising a piston rod for controlling the light-beam, a double-acting piston and cylinder device, the piston being arranged to have a limited freedom of movement independently of the piston rod and axially of the latter, a locking wedge in the form of two truncated cones disposed on the piston rod with the ends of large diameter facing in opposite directions, two series of co-operating locking balls urged between the conical surfaces of the wedge and the cylinder wall and serving to lock the piston rod normally in a rigid position, a cage within which the balls are positioned carried by the piston and surrounding the locking wedge so that upon initial movement of the piston the balls are carried by the cage out of locking engagement with the wedge, and a resilient wearing sleeve carried by the said cage and adapted to be forced outwards into gripping engagement with the cylinder upon attempted movement of the piston rod when the balls are in locking position.

14. A headlight controlling device comprising a piston rod for controlling the light-beam, a double-acting piston and cylinder device, the piston being arranged to have a limited freedom of movement independently of the piston rod and axially of the latter, a locking wedge in the form of two truncated cones disposed on the piston rod with the ends of larger diameter facing in opposite directions, two series of co-operating locking balls urged between the conical surfaces of the wedge and the cylinder wall and serving to lock the piston rod normally in a rigid position, a cage within which the balls are positioned carried by the piston and surrounding the locking wedge so that upon initial movement of the piston the balls are carried by the cage out of locking engagement with the wedge, and a resilient wearing sleeve carried by the said cage and having wedge-shaped slots therein into which the balls are adapted to be forced by attempted movement of the piston rod when the balls are in locking position, whereby the sleeve is forced into firm gripping contact with the cylinder.

In testimony whereof we have signed our names to this specification.

GEORGE HENRY ABELL.
ROBERT GLADSTONE WELLS.